(12) United States Patent
Frank

(10) Patent No.: US 12,292,506 B2
(45) Date of Patent: May 6, 2025

(54) IMAGING APPARATUS AND METHOD

(71) Applicant: TERVIZIO 3D LTD., Givatayim (IL)

(72) Inventor: Amit Frank, Givatayim (IL)

(73) Assignee: TERVIZIO 3D LTD., Givatayim (IL)

( * ) Notice: Subject to any disclaimer, the term of this patent is extended or adjusted under 35 U.S.C. 154(b) by 125 days.

(21) Appl. No.: 18/015,306

(22) PCT Filed: Jul. 6, 2021

(86) PCT No.: PCT/IL2021/050829
§ 371 (c)(1),
(2) Date: Jan. 9, 2023

(87) PCT Pub. No.: WO2022/009202
PCT Pub. Date: Jan. 13, 2022

(65) Prior Publication Data
US 2023/0273316 A1 Aug. 31, 2023

(30) Foreign Application Priority Data
Jul. 7, 2020 (IL) .......................................... 275896

(51) Int. Cl.
*G01S 17/894* (2020.01)
*G01J 5/48* (2022.01)
(Continued)

(52) U.S. Cl.
CPC ................. *G01S 17/86* (2020.01); *G01J 5/48* (2013.01); *G01S 17/894* (2020.01);
(Continued)

(58) Field of Classification Search
CPC ..... G01S 7/4865; G01S 17/894; H04N 23/23; H04N 13/254
See application file for complete search history.

(56) References Cited

U.S. PATENT DOCUMENTS 8,742,347 B2 * 6/2014 Altmann .................. G01N 1/00
250/332
9,215,386 B2 12/2015 Elkind et al.
(Continued)

FOREIGN PATENT DOCUMENTS

EP 2942644 A1 11/2015
JP 2018535402 A 11/2018
(Continued)

OTHER PUBLICATIONS

Lock-in Thermography; Albrechts—2009; (Year: 2009).*
(Continued)

*Primary Examiner* — Luis Perez-Fuentes
(74) *Attorney, Agent, or Firm* — Holtz, Holtz & Volek PC

(57) ABSTRACT

An imaging apparatus with a 3D thermal imager, a signal processor, a laser, an optical scanner, a controller, and a bimodal array which operates a plurality of slow response thermal detectors for generating a 2D thermal image as input to the signal processor. The controller operates the bimodal array, the laser, the optical scanner, and the thermal imager in predetermined sequence to derive range data for communication to the signal processor which interlaces the 2D thermal image with the range data to generate 3D thermal imaging. A method using a slow response thermal detector for deriving a detected analog signal from an emitted laser pulse returned from a target, asynchronously sampling the detected signal for deriving therefrom two series of time events corresponding to the ascending and the decaying portions of the detected signal. The time of flight and range being calculated by using the two series of time events.

15 Claims, 9 Drawing Sheets

(51) Int. Cl.
    *G01S 17/86*     (2020.01)
    *H04N 13/254*     (2018.01)
    *H04N 13/296*     (2018.01)
    *H04N 23/23*     (2023.01)
    *G01J 5/00*     (2022.01)

(52) U.S. Cl.
    CPC ......... *H04N 13/254* (2018.05); *H04N 13/296* (2018.05); *H04N 23/23* (2023.01); *G01J 2005/0077* (2013.01)

(56) References Cited

U.S. PATENT DOCUMENTS

| | | | |
|---|---|---|---|
| 10,582,121 | B2 | 3/2020 | Kamilov et al. |
| 11,698,435 | B2 | 7/2023 | Eberspach et al. |
| 2009/0008555 | A1 | 1/2009 | Dupont et al. |
| 2012/0069322 | A1 | 3/2012 | Kostamovaara |
| 2012/0261553 | A1 | 10/2012 | Elkind et al. |
| 2015/0042764 | A1* | 2/2015 | Xi .................. H04N 13/254 348/47 |
| 2018/0017679 | A1 | 1/2018 | Valouch et al. |

FOREIGN PATENT DOCUMENTS

| | | | |
|---|---|---|---|
| JP | 2020503500 | A | 1/2020 |
| KR | 20120116873 | A | 10/2012 |
| KR | 20190088472 | A | 7/2019 |
| WO | 2020018600 | A1 | 1/2020 |

OTHER PUBLICATIONS

Development_of_3D_hyperspectral_camera_using_compressive_sensing; Xi—2012; (Year: 2012).*
International Search Report (ISR) dated Nov. 1, 2021, issued in International Application No. PCT/IL2021/050829.
Written Opinion (WO) dated Nov. 1, 2021, issued in International Application No. PCT/IL2021/050829.
Dereniak, et al., "Infrared Detectors and Systems", Chapter 5, para. 5.6, pp. 190-192, Apr. 1996.
Margarit, et al., "A 2-kfps Sub-µW/pix Uncooled-PbSe Digital Imager with 10-bit DR Adjustment and FPN Correction for High-Speed and Low-Cost MWIR Applications", IEEE Journal of Solid-State Circuits 50, 10 (2015); 2394-2405, Sep. 2, 2015.
Extended European Search Report (EESR) dated Jul. 24, 2023, issued in counterpart European Application No. 21838818.9.
International Search Report (ISR) dated Aug. 8, 2022, issued in International Application No. PCT/IL2021/050829.
Japanese Decision to Grant a Patent (and an English language translation thereof) dated Nov. 7, 2023, issued in counterpart Japanese Application No. 2023-501224.
Japanese Office Action (and an English language translation thereof) dated Jun. 27, 2023, issued in counterpart Japanese Application No. 2023-501224.
Korean Written Decision on Registration (and an English language translation thereof) dated Jul. 31, 2024, issued in counterpart Korean Application No. 10-2022-7038737.

* cited by examiner

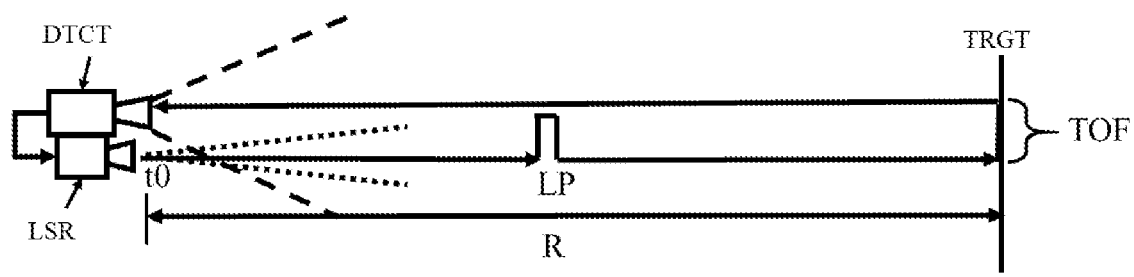
Fig. 12  Common practice
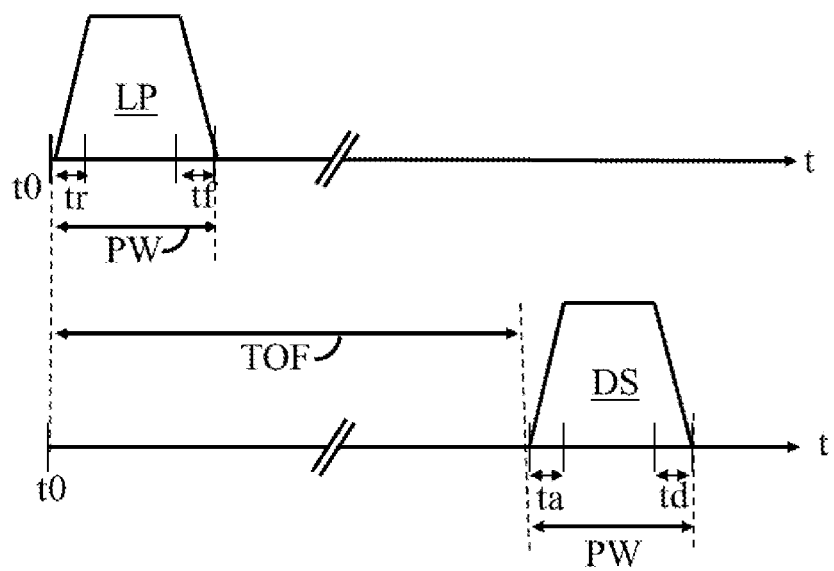
Fig 13  Common practice

IMAGING APPARATUS AND METHOD

TECHNICAL FIELD

The present disclosure relates to a 3D camera and to a method for range finding, and in particular, to an apparatus utilizing slow response detectors operating in the thermal region of the optical spectrum, to perform thermal imaging, to measure range, and to interlace the range with 2D thermal images, for deriving 2D images and 3D imaging data from a viewed scenery.

BACKGROUND

Imaging apparatus or imaging devices are well known in the art and are widely operated for various purposes, such as in the field of range finding, for thermal imaging in 2D, and for obtaining 3D imaging data. One drawback with available sophisticated devices is their construction which requires high quality, and thus high-priced signal detectors. Another drawback is the need to use cooled thermal detectors, due to their high cost and low reliability. A further drawback is that such devices are dedicated to a specific use. For example, one range finder to measure distance, one 2D thermal imager to differentiate between temperatures, and one 3D imager to obtain 3D images.

It would thus be advantageous to provide an apparatus able to combine a plurality of imaging devices in a single apparatus. For example, a 3D imaging camera which incorporates and combines the features of a range finder and of a 2D thermal imager, and in addition, is affordable by using uncooled and slow response detectors, but provides results equaling rank topping equipment.

DESCRIPTION OF RELATED ART

The equations derived hereinbelow regarding the change in the amount of charge carriers in a photo-detector as a response to incident light radiation of flux $\phi e$ (t), are based on the book "Infrared Detectors and Systems", by E. L. Dereniak, and G. D. Boreman, Chapter 5, para. 5.6 pp. 190-192, referred to hereinbelow as Dereniak.

Also relevant are WO2020/018600 to MAIMON Shimon of 23/01/2020 recites image detectors for sensing objects including optionally sensing weather phenomena, and Margarit, Josep Maria, et al. "A 2 kfps sub-μ W/Pix uncooled-PbSe digital imager with 10 bit DR adjustment and FPN correction for high-speed and low-cost MWIR applications." IEEE Journal of Solid-State Circuits 50.10 (2015): 2394-2405.

SUMMARY OF INVENTION

It is an object of the embodiments described herewith to disclose an apparatus and a method of implementing of an apparatus for 3D imaging combining range measurement with 2D thermal images. The apparatus comprises a signal processor, a laser device, an optical scanner, and a controller.

A characteristic of the apparatus, according to exemplary embodiments, is the use of slow-response thermal detectors for 3D imaging with high range resolution. Slow-response detectors are commonly available and are advantageously priced. The apparatus combines 2D thermal images with range data and creates 3D thermal imaging therefrom.

A further characteristic of the apparatus, according to exemplary embodiments, is the use of a bimodal array BMDARR of slow response thermal detectors THRDTC which produces either standard thermal imaging, or asynchronous pixel sampling for range finding. The bimodal array is commanded by the controller and includes a plurality of slow response thermal detectors. Furthermore, the bimodal array is designed to produce a 2D thermal image as well as accurate range data by use of each one of the slow response thermal detectors. Both the 2D thermal image, collected by each slow response thermal detector in the array and the range data, are forwarded to the signal processor.

The controller is further configured to operate the laser, the optical scanner, and each one slow response thermal detectors of the thermal imager. Thereby, the controller is able to operate the laser, the optical scanner, and the thermal detectors of the thermal imager to derive therefrom range data. That range data is collected by use of a pixel sampling circuit which is dedicated to derive a plurality of couples of time events $t1i$ and $t2i$. Those couples of time events $t1i$ and $t2i$ are derived from a sampled detected signal DS which is communicated to the signal processor.

Finally, the signal processor is configured to compute the range with a degree of accuracy much superior to the accuracy relative to the response time of the slow response thermal detectors in the array. The signal processor is able to interlace the 2D thermal image with the range data, to generate 3D thermal imaging combining the range data with the 2D thermal images.

It is noted that the bimodal array includes a plurality of slow response thermal detectors, and that each one of those thermal detectors produces one pixel in a 2D thermal image and in a 3D image.

Furthermore, a method for constructing and implementing an apparatus for 3D imaging combining range measurement with 2D thermal images is provided. The apparatus includes a 3D thermal imager, a signal processor, a laser, an optical scanner, and a controller. The apparatus uses a slow response thermal detector THRDTC for deriving data from a detected analog signal. The analog signal may be a response to an emitted laser pulse LP which is returned from a target. The apparatus is configured to asynchronously sample the detected signal and to derive data therefrom. Such derived data may include two series of time events, which are marked as, respectively, $t1i$ and $t2i$.

The apparatus is further configured to derive from the data a length of time Tbg, which equals the time of flight TOF, by use of mathematical equations. These equations include one of the equation 3, and equations 4.1 to 4.3. Thereafter, the range R to the target TRGT is calculated by use of equation 5.

Technical Problem

One problem relates to the implementation of an apparatus for range finding which utilizes a slow response detector device, wherein slow response means: use of a cooled or uncooled thermal detector having a relatively slow time response for operation in the thermal region of the optical spectrum. A slow time response means slow relative to a desired time dependent resolution of the range measurement, but still, functioning as a range finder which is accurate for the desired range measurement resolution. The thermal region of the optical spectrum is defined as the range of optical wavelengths from 2 μm to 14 μm.

Another problem is how to integrate in an apparatus APP both 3D imaging of the viewed scenery with 2D thermal images, in order to obtain a 3D thermal image of the entire scenery or of a selected portion thereof. 2D means two dimensional and 3D means three dimensional.

FIG. 12 illustrates the principles of operation of a commonly used range measurement device. Common range finders measure the time of flight TOF, which is the time taken by a laser pulse LP emitted towards a target TRGT by a lasing device LSR, to hit the target TRGT and return therefrom to a photo detector DTCT, or detector DTCT for short. The range R may then be calculated by multiplying half of the derived time of flight TOF with the speed of light. Evidently, the accuracy of the range measurement depends on the accuracy of the measurement of the time of flight TOF.

For this purpose, those common accurate range finders require both, a fast response detector having a time constant t shorter than a desired time resolution, dt, which is dependent on the resolution of the range measurement, and a laser pulse LP having a narrow pulse width PW, shown in FIG. 13, having the same order of time magnitude as the time constant τ.

FIG. 13 depicts the time sequence of a short laser pulse LP emitted towards a target TRGT and returned therefrom, and the detected analog signal DS derived from the laser pulse LP by a fast response photo detector DTCT operative as a common practice range measurement device. The time of flight TOF is also shown in FIG. 13.
The equation generally used to derive the distance separating a target TRGT apart from a range finder is $$R = c * TOF/2 \qquad \text{(equ. 1)}$$

where R is the range, c is the speed of light and TOF/2 is the time of flight TOF divided by two, since the time measured from the time of emission of the laser pulse to the beginning of generation of the detector signal DS equals the time taken by light to travel both ways, to the target TRGT and back to the detector DTCT.

For example, to obtain a range accuracy measurement of 5 m, the required time resolution dt would be the time light travels 5 m forth and back, which is approximately 33 ns. Therefore, a slow response detector DTCT having a time constant τ of less than 1ns would be required to measure the range R with such accuracy. Since many slow response detectors DTCT, and specifically slow response thermal detectors THRDTC have time constants t ranging from a few us to a few ms, it would be advantageous if the same range measurement accuracy could be achieved with those slow response detectors DTCT.

Still another problem relates to the capability to use the apparatus APP as a LIDAR, or Light Imaging Detection And Ranging device, and to derive 2D thermal images from the viewed scenery for their interlacing with the ranges measured by the LIDAR. In other words, the capability of the apparatus APP to combine the measured ranges with the 2D image pixels, to form a 3D thermal representation, or 3D thermal image, of targeted objects. A 3D thermal representation is a mathematical representation of the surfaces and/or the dimensions of an object, including the object's length, width, and depth, as well as the relative temperature thereof.

Common LIDAR systems use fast response detectors DTCT, either as single detectors or in arrays of detectors, and short-pulse lasers LSR to produce 3D representations. LIDARs operating in the near infrared region of the optical spectrum are commercially available, but do not allow obtaining of 2D thermal images of the viewed scenery in combination with the 3D imaging of that same scenery.

The data contained in a 2D thermal image, representing the relative temperatures between the pixels, and the data contained in a 3D image, representing the different ranges to each pixel, complement each other. It would be advantageous for purposes of advanced image processing, algorithms and Artificial Intelligence, if both could be represented interlaced as one 3D thermal representation or image. An apparatus APP for obtaining such a 3D thermal representation based on a slow response dual mode thermal detector array, or bimodal array BMDARR for short, may further be advantageous for the sake of cost effectiveness and simplicity of design.

Solution to Problem

To solve the first problem, a method for measuring a range R by use of a slow-response thermal detector THRDTC is now described.

FIG. 1 schematically depicts a graph of amplitude vs. time of a laser pulse LP emitted at time t=0. The amplitude of the laser pulse LP rises through a rise time tr to a plateau, then falls through a fall-time tf, and has a pulse width PW which lasts longer in time than a time constant τ of a slow-response detector THRDTC. The time constant τ is not shown in the FIGS.

FIG. 1 further depicts the detected signal DS derived by the slow time response detector THRDTC from the laser pulse LP emitted toward and returned from the target TRGT. Since the detected signal DS starts at the end of the time of flight TOF, the start time of the detected signal DS is thus time Tbg. By definition, the time Tbg equals the time of flight TOF, i.e. the time taken by a laser pulse LP emitted towards a target TRGT by a lasing device LSR, to hit the target TRGT, and return therefrom. Hence:

$$TOF = Tbg \qquad \text{(equ. 2)}$$

As shown in FIG. 1, the detected signal DS ascends exponentially from the end of the time of flight TOF, until a time Tpeak at which the maximal intensity of the detected signal DS is reached, whereafter the detected signal DS decays exponentially. Reference is now made to the sampling of the detected signal DS, and in particular to a method of asynchronous sampling.

FIG. 2 illustrates the asynchronous sampling of the detected signal DS, and FIG. 3 depicts a particular result of such a sampling process.

By definition, an asynchronous sampling method samples both the ascending portion ta and the decaying portion td of the detected signal DS, and sampling proceeds in sequential and consecutive amplitude steps of constant and equal amplitude levels AMPLVLi.

In FIG. 2, the amplitude intervals which separate between the levels of amplitude AMPLVLi are constant, but not so for the time intervals that separate apart between the successive time events of asynchronous sampling. For each one level of amplitude AMPLVi, the asynchronous sampling method derives two sampled signals which correspond to two time events. A first time event t1$i$ for the ascending portion ta of the detected signal DS, and a second time event t2$i$ for the decaying portion td of the detected signal DS. Thus, with an index i for one same amplitude level AMPLVLi, and an index j=1 for the occurrence of the time event during the ascending portion and an index j=2 for the decaying portion of the sampled detected signal DS, the amplitude level may be marked as AMPLVLi, and the asynchronous time samplings as tji. The index i is an integer ranging from 1 to n, and the index j is either 1 or 2. In FIG. 2, for example, for the amplitude level with i=3, or AMPLVL3, the corresponding values of time events tji are t13 and t23.

FIG. 3 clearly shows that the amplitude intervals which separate between the levels of amplitude AMPLVLi are constant, whereas the distance which separates apart between two time events tji is dependent from the shape of the detected signal DS. Furthermore, FIG. 3 illustrates a particular case in which the sampled signal SIGSMP has three different amplitude levels AMPLVL. In a more general case, a plurality of amplitude levels AMPLVLi may be generated, depending on the target's range R, on the target's radiometric properties, such as emissivity, and on the amplitude intervals INTVL which separates apart between the levels of amplitude AMPLVLi.

The two series of time events, namely t1$i$ and t2$i$, may be used to calculate the beginning time Tbg of the detected signal DS shown in FIGS. 1, 2, and 3, by use of the following equations. When the rise times tr and the falling times tf are about zero or close to zero, thus for tr≈tf≈0, the beginning time Tbg of the detector signal DS may be calculated by use of the following equation 3:

$$Tbg = -\tau \cdot \ln\left(e^{-t1i/\tau} + \left(e^{PW/\tau} - 1\right) \cdot e^{-t2i/\tau}\right) \quad \text{(equ. 3)}$$

In other cases, the detector signal beginning time Tbg may be calculated by use of the following three equations, namely equ. 4.1 to equ. 4.3:

$$Tbg = -\tau \cdot \ln\left(Cr \cdot e^{-(t1i-tr)/\tau} + (Cf - Cr \cdot e^{-(PW-tr/\tau)} \cdot e^{-(t2i-PW)/\tau}\right) \quad \text{(equ. 4.1)}$$

$$Cr = \frac{\tau}{tr}\left(1 - e^{-tr/\tau}\right) \quad \text{(equ. 4.2)}$$

$$Cf = \frac{T}{tf}\left(1 - e^{-tf/\tau}\right) \quad \text{(equ. 4.3)}$$

The time Tbg may be calculated either by selection of one pair of times t1$i$ and t2$i$ corresponding to a specific amplitude level AMPLVLi, or alternatively, by averaging over several Tbg time values by use of several time events t1$i$ and t2$i$ belonging to several amplitude levels AMPLVLi.

The range R to the target TRGT may now be calculated by use of equation 2 and equation. 5:

$$R = c \ast Tbg/2 \quad \text{(equ. 5)}$$

It is noted that the only variants in the calculation of the range R are the series of times events t1$i$ and t2$i$.

It may thus be said in conclusion that a slow-response detector THRDTC, i.e. a cooled or an uncooled thermal detector having a relatively slow time response, may be used for range R measurement. The precision of the range measurement R depends only on the accuracy of the time measurement of the series of time events t1$i$ and t2$i$.

Advantageous Effects of Invention

The apparatus APP as described herewith has the technical advantages of using slow response detectors, for deriving 3D thermal imaging combining range measurement and 2D thermal images. That description is short of disclosing or even hinting at the many practical advantages in many fields of use.

Practically, advantages of the apparatus APP include range measurement, and the presentation of a scenery in 3D, in combination with selected 2D thermal images of the scenery.

Performance of the apparatus APP may be enhanced for specific use by calibration of range and of geometrical dimensions measurement, and to relative or absolute temperature measurement.

For public health purposes, the apparatus APP collectively recognizes those individuals out of a first group of people having a body temperature above an a priori selected level, which individuals are personally targeted, located by range, and identified by measurements of biometric features. In addition, the apparatus APP recognizes those individuals who are closer to individuals of the firstly recognized group by less than a specifically selected range of mutual distance of separation, and identifies a second group of individuals as being in risk of being infected by the first identified group. Thereby, the apparatus APP replaces the sequential testing and identification of ill or contaminated people. For example, in case of an epidemic, the apparatus APP enables the automatic designation and identification of those specific individuals out of a crowd, that are at risk of being infected by the epidemic due to their disregard of minimal mutual separation apart distances. Thereby, quarantining of those individuals at risk may prevent the outspread of the epidemic to the population.

Lifesaving may be realized by the combination of the herewith described triple technical achievements with their economic advantages of simplicity of design and low-cost production. The application of such a combination of technical features to advanced driver assistance systems (ADAS), say for detection and avoidance of people and animals in poor visibility conditions, and when handling complex situation hazards for accident prevention, is thus available and cost effective relative to present systems.

Lifesaving may also be realized by installing the apparatus APP inside the cabin of a vehicle for sensing of the driver's biometrics and for providing a warning to avoid forgetting infants in a parked vehicle.

In case of a blaze, the apparatus APP is able to detect people even if hidden from sight beyond a wall of flames, and also to recognize their number and their distance.

In industry for example, with a group of products disposed in the field of view of the apparatus APP, products that exceed predetermined threshold dimensional tolerances and/ or temperature ranges are detected and identified simultaneously instead of by separate discrete inspection procedures.

In robotics for example, the apparatus APP may be used as an improved artificial eye whereby an accurate 3D image that includes thermal mapping can provide robots with additional data thus increasing the accuracy of the surrounding area's image.

The apparatus APP may also be used in cities incorporating advanced technologies to improve the inhabitants' experience and well-being, also known as "smart cities" for improving a control center's situational awareness, adding 3D Thermal and Lidar imaging to existing optical cameras for increased public safety in a cost-effective manner.

BRIEF DESCRIPTION OF DRAWINGS

In the drawings, like reference characters generally refer to the same parts throughout the different views. Also, the drawings are schematic and not to scale, emphasis instead generally being placed upon illustrating the principles of the invention. Various non-limiting embodiments of the present invention are described with reference to the following description of exemplary embodiments, in conjunction with the figures in which:

FIG. 12 illustrates the principles of operation of a commonly used range measurement method, and FIG. 13 depicts the time sequence of a short laser pulse emitted to and returned from a target, as well as the analog signal detected therefrom by a fast response photo detector, as used with common practice range measurement methods.

DESCRIPTION OF EMBODIMENTS

The hereinabove described range finding method using a slow-response thermal detector THRDTC may be implemented in the apparatus APP.

Figures 4, 5:
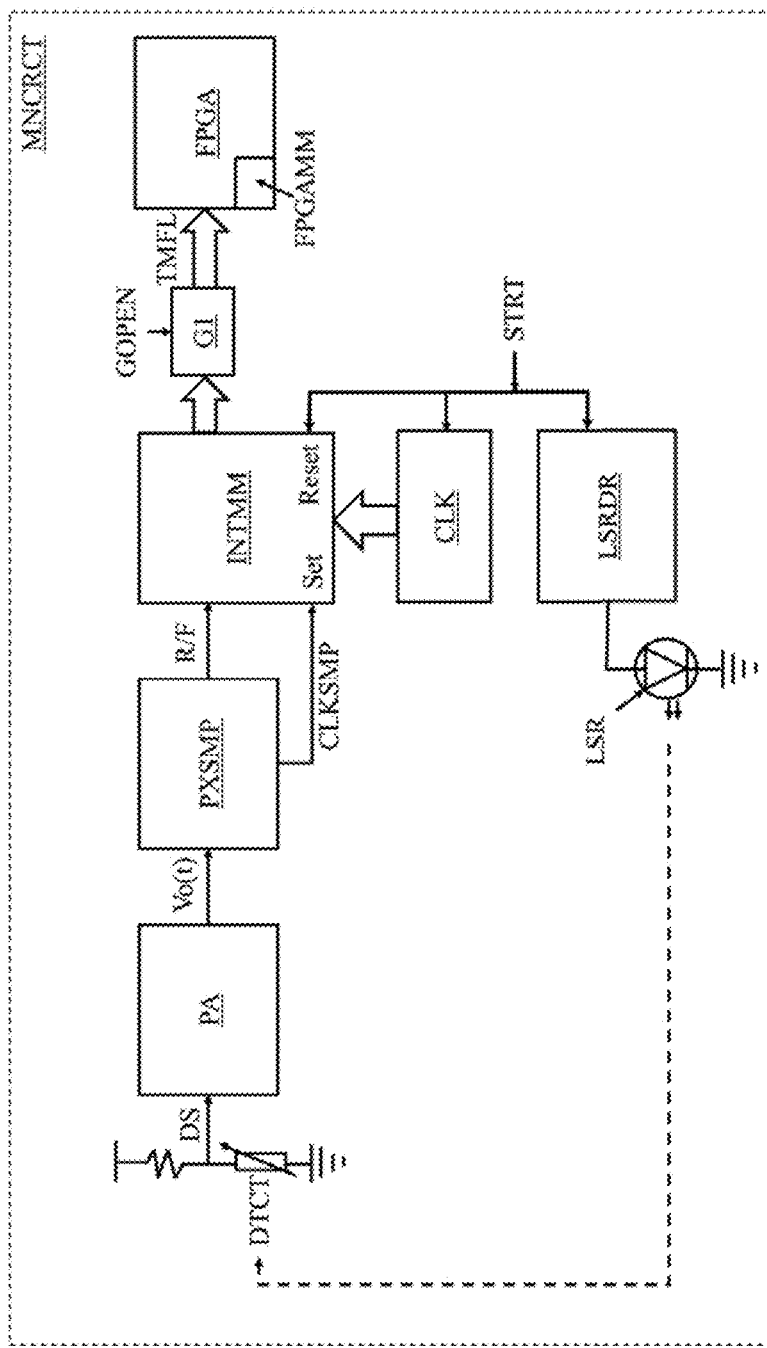
FIG. 4 is a block diagram of a main electrical circuit MNCRCT showing electrical elements of the apparatus APP which measures range by use of a slow response thermal detector THRDTC and by asynchronous sampling.
FIG. 5 illustrates a data storage pattern symmetric about a transition point TRPNT, for use with the asynchronous sampling process.

FIG. 4 is a schematic block diagram of a main electrical circuit MNCRCT showing electrical elements of the apparatus APP for range R measurement by use of low-cost detectors and of asynchronous sampling, and illustrates the operation thereof. A low-cost detector may cost at least one order of magnitude, or even two orders of magnitude less than the cost of a commercially available high quality and high-speed detector.

At time t=0, a start signal STRT is given, which simultaneously initializes two elements of the apparatus APP, namely the laser driver LSRDR and the clock CLK, or time counter CLK, which starts to count time. The start signal STRT also resets a thereto coupled interim memory INTMM. Once initialized by the start signal STRT, the laser driver LSRDR commands a thereto coupled lasing device LSR, or laser LSR, to emit a first laser pulse LP. This first laser pulse LP is thence sent to the target TRGT and is returned therefrom to the apparatus APP. Upon return from the target TRGT, the laser pulse LP is received by a detector THRDTC, which may be a slow response thermal detector THRDTC.

In turn, the thermal detector THRDTC converts the light collected from the laser pulse LP to an electrical signal referred to as a detected signal DS. The thermal detector THRDTC receives the first laser pulse LP from the time of emission thereof, starting at the time t=Tbg, until the time of return of the end of that first laser pulse LP at the time t=TOF+PW, as illustrated hereinabove in relation to FIG. 13. As shown in FIG. 13, TOF is the time of flight, PW is the pulse width, tr is the rise time and tf is the fall time of the laser pulse LP. The slow response thermal detector THRDTC may be a single detector THRDTC or else, one pixel PXL of a slow response bimodal array BMDARR, which is described hereinbelow. In response to the first laser pulse LP, the slow response thermal detector THRDTC outputs a detected signal DS to a pre-amplifier PA. The pre-amplifier PA is a common practice pre-amplifier circuit.

The pre-amplifier PA is used to amplify the detected signal DS to an analog voltage signal Vo(t), which in turn, serves as an input to the pixel sampling circuit PXSMP. The functionality of the pixel sampling circuit PXSMP is twofold. The first function of the pixel sampling circuit PXSMP is to determine and indicate whether the voltage signal Vo(t) is rising or is falling. A flag signal marked R/F is set either to LOGIC1 if the voltage signal Vo(t) is rising, or to LOGIC0 if the voltage signal Vo(t) is falling. The second function of the pixel sampling circuit PXSMP is to determine whether the signal Vo(t) has reached a next amplitude level AMPLVLi. If so, the pixel sampling circuit PXSMP sends a clock sampling signal CLKSMP to the interim memory INTMM, which causes the interim memory INTMM to save the current readings of the flag signal R/F and of the clock CLK. The clock CLK is a standard time counting component having a resolution which is derived from the required range measurement resolution.

Figure 2:
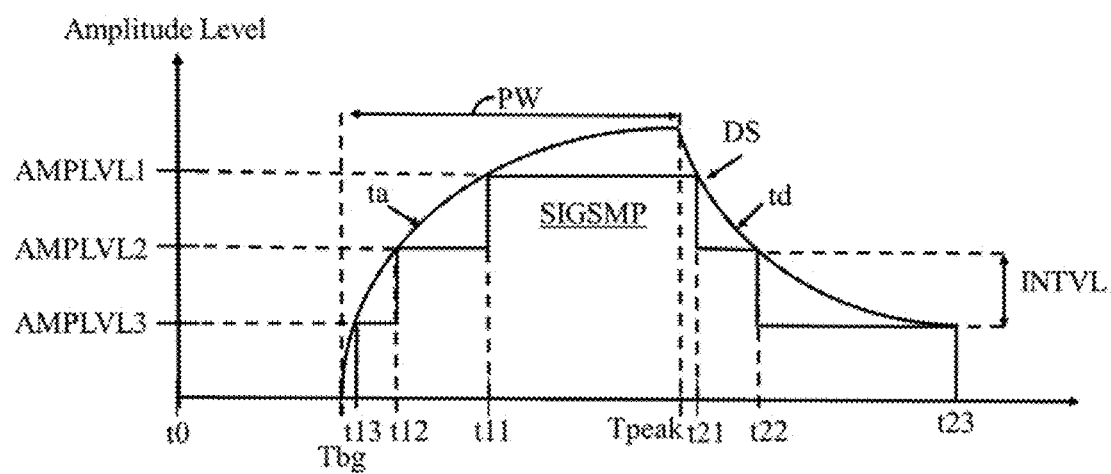
FIG. 2 illustrates the asynchronous sampling which proceeds in constant amplitude intervals INTVL of the analog signal produced by the slow-response detector in response to the received long laser pulse.
Figure 3:
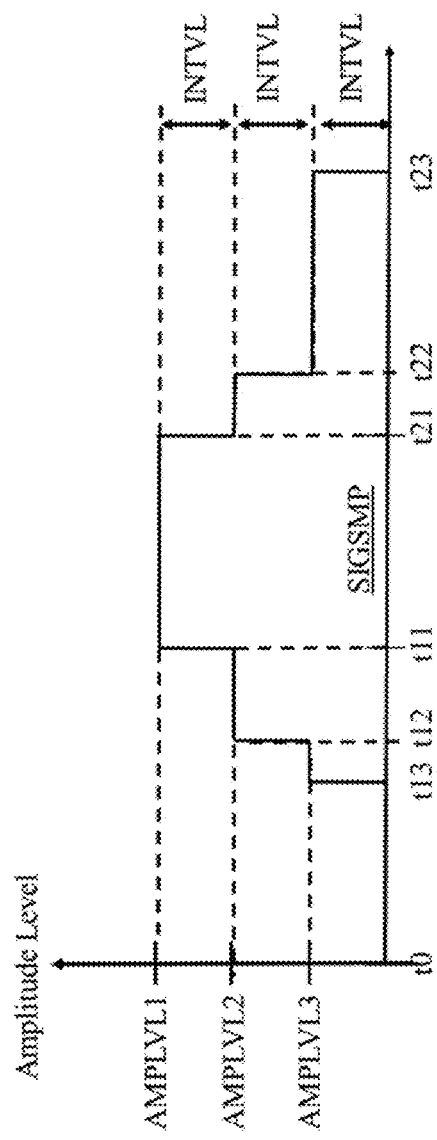
FIG. 3 illustrates an exemplary structure of the signal SIGSMP having three amplitude levels AMPLVLi.

For example, if the required range resolution is 5 m, the time counting resolution of the clock CLK should be selected as 33 ns, as explained hereinabove with reference to FIG. 12. This pixel sampling circuit PXSMP, which is coupled to the interim memory INTMM, runs a process which creates the two series of time events t1i and t2i described hereinabove with respect to FIGS. 2 and 3. This process creates the two series of time events t1i and t2i for storage in the interim memory INTMM, wherein for each sampled clock time CLK, the flag signal R/F denotes whether the time event belongs to the series t1i of the rising portion of the sampled signal SIGSMP, or to the series t2i of the falling portion thereof. The interim memory INTMM is coupled to a gate G1 which is further coupled to a standard field-programmable gate array FPGA, or gate component FPGA for short.

Figure 8:
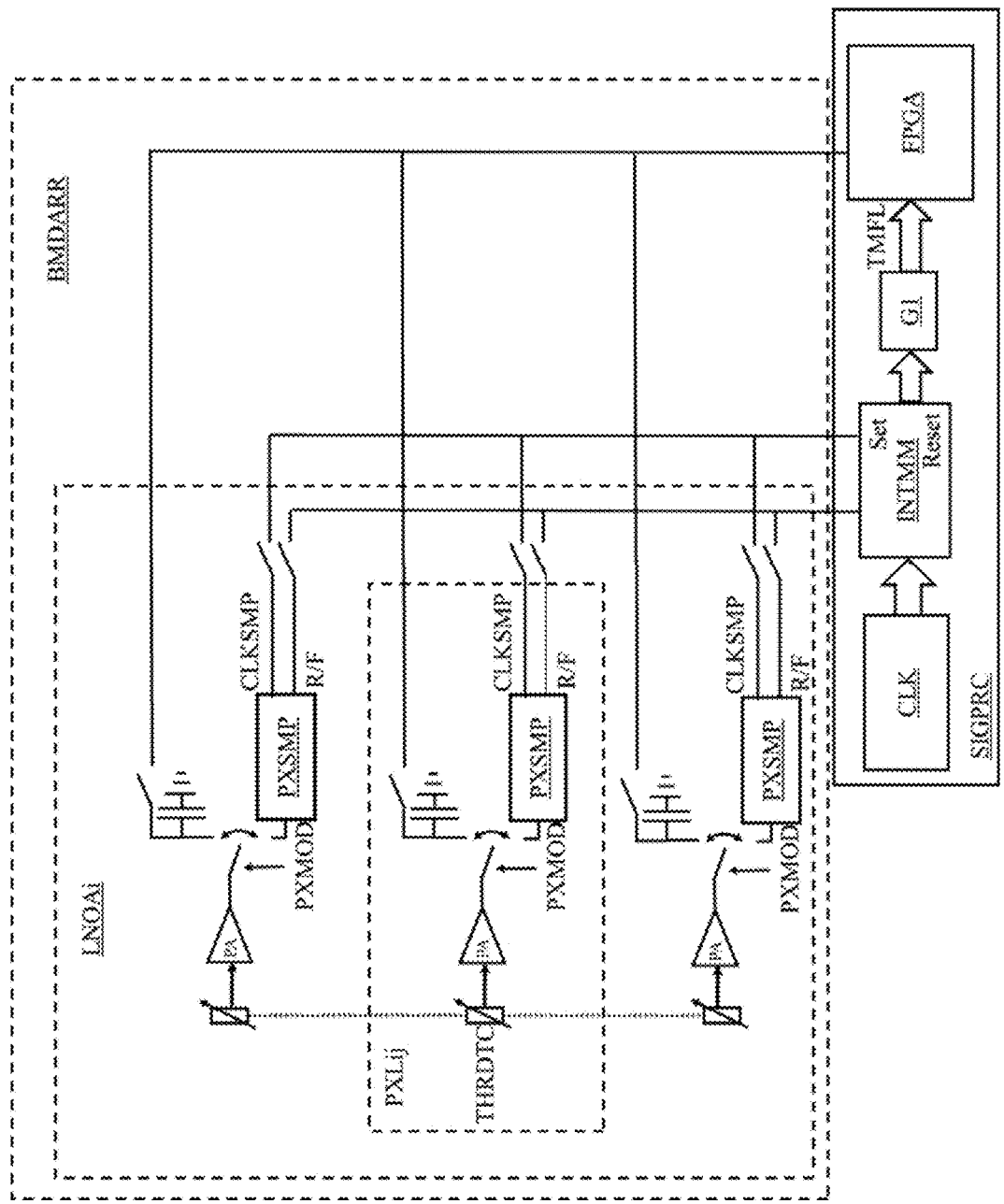
FIG. 8 illustrates a bimodal array BMDARR for thermal imaging and for range finding, with emphasis on a selected line i.

A signal sent by the signal processor SGNPRC, shown in FIG. 8, opens the gate G1, whereby the two series of time events t1i and t2i are forwarded as a data file TMFL to the gate component FPGA. The gate component FPGA first locates the transition point TRPNT in the data file TMFL by locating the emplacement in the file where the flag signal R/F changes from LOGIC1 to LOGIC0.

FIG. 5 thus illustrates that the transition point TRPNT is found by searching the data file TMFL for that location where the LOGIC1 switches to LOGIC0, or the location where the LOGIC0 changes to LOGIC1.

Figure 1:
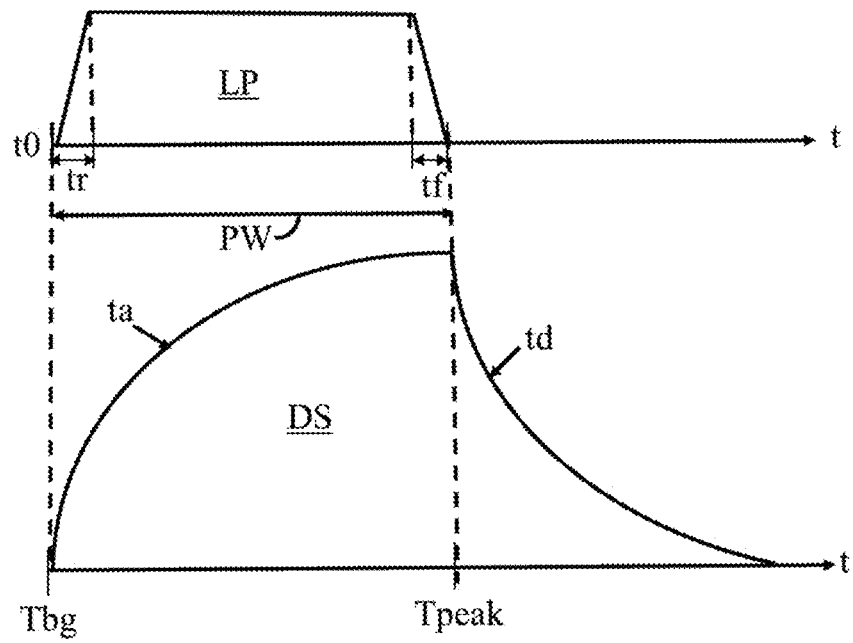
FIG. 1 presents a graph of a laser pulse LP, and a therefrom derived signal DS as captured by a slow-response thermal detector THRDTC.

As depicted in FIG. 5, the data file TMFL has a storage pattern which is symmetrical about the transition point TRPNT of the series of time events t1i and t2i. Hence, the two time events t11 and t21 closest to the transition point TRPNT, on either side thereof, belong to the maximum amplitude level AMPLVL1. The next two second time events disposed in symmetry about the transition point TRPNT belong to the next amplitude level AMPLVL2, and so forth. These pairs of time events, t1i and t2i, are then used by the gate component FPGA together with the equations 3, the equations 4.1 to 4.3, and the equation. 5, to calculate the time Tbg of the detected signal DS and the range to the target TRGT, as described hereinabove with respect to FIGS. 1 and 3. The implementation in the gate component FPGA of these equations, namely equations 3, 4.1 to 4.3, and 5, is common engineering practice. The other parameters required for the calculation of the range R, including the width PW of the laser pulse LP, the rise time tr, and the fall time tf, the time constant τ of the detector, and the speed of light c, are either system constants or physical constants, which may be stored a priori, in a memory of the gate component during assembly in factory.

Pixel Sampling Circuit Implementation

Figure 6:
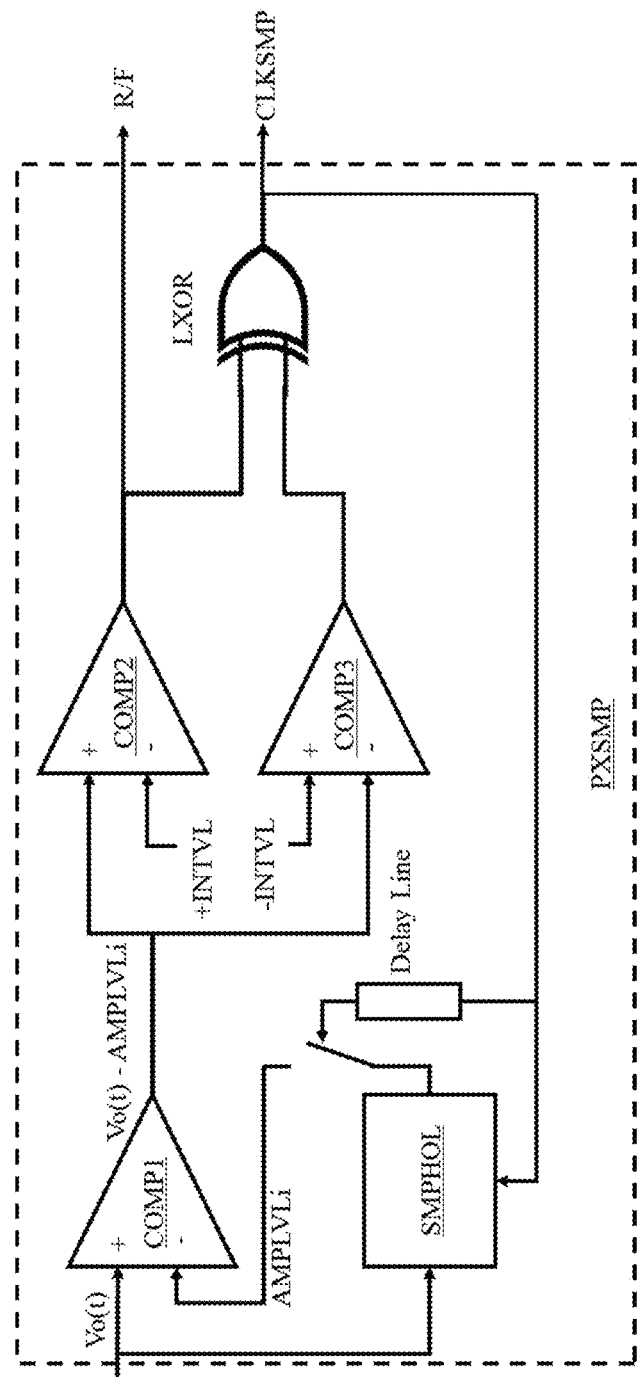
FIG. 6 illustrates a pixel sampling circuit PXSMP.

An exemplary schematic embodiment of a pixel sampling circuit PXSMP is illustrated in FIG. 6.

At a first stage in FIG. 6, a first comparator COMP1 computes the instantaneous difference between the analog amplified voltage signal Vo(t) received from the preamplifier PA, as depicted in FIG. 4, and an immediately previous amplitude level AMPLVLi. For the first sample of the sampling process, the first sampling amplitude AMPLVLi is set to zero.

Thereafter, at a second stage, a pair of comparators, namely a second comparator COMP2 and a third comparator COMP3, which are coupled to the first comparator COMP1, receive the output of the first comparator COMP1, and compare the instantaneous difference of the output of the first comparator COMP1 with a positive and a negative constant voltage, respectively +INTVL and −INTVL. When the instantaneous difference between the signal Vo(t) and the amplitude level AMPLVLi equals +INTVL, the output of the comparator COMP2 rises to a voltage level defined as LOGIC1, hence indicating a rise of the voltage Vo(t) by an amplitude level in comparison to the previous amplitude level AMPLVLi. When the instantaneous difference between the signals Vo(t) and the amplitude level AMPLVLi equals-INTVL, the output of the third comparator COMP3 rises to a voltage level defined as LOGIC1, hence indicating a decay of the voltage Vo(t) by an amplitude level in comparison to the previous amplitude level AMPLVLi. Thus, the output of the second comparator COMP2 may serve as the output flag signal R/F of the pixel sampling circuit PXSMP, as explained hereinabove in reference to FIG. 4.

Next, at a third stage, a logic XOR gate LXOR, receives the output of the pair of comparators, namely the second comparator COMP2 and the third comparator COMP3 of the second stage. If the output of either one of both the second comparator COPM2 or the third comparator COPM3 is set to LOGIC1, but not the output of both of them together, the logic XOR gate LXOR will produce a second logic output clock sampling signal CLKSMP. The second logic output clock sampling signal CLKSMP will save the current readings of the flag signal R/F and of the clock CLK to the interim memory INTMM as explained hereinabove with reference to FIG. 4. In addition, when the clock sampling signal CLKSMP is LOGIC1, a standard sample and hold circuit SMPHOL, coupled to the output of the logic XOR gate LXOR, will sample the current value of the signal Vo(t). This last current value of the signal Vo(t) will be accepted as the new immediately previous amplitude level AMPLVLi, as a reference for a next iteration of the pixel sampling circuit PXSMP. A standard delay line DL is used to delay the input of this new amplitude level AMPLVLi to the first stage comparator COMP1, so as to avoid the occurrence of a possible internal collision due to the asynchronous nature of this process.

Imaging Detector Implementation

Figure 7:
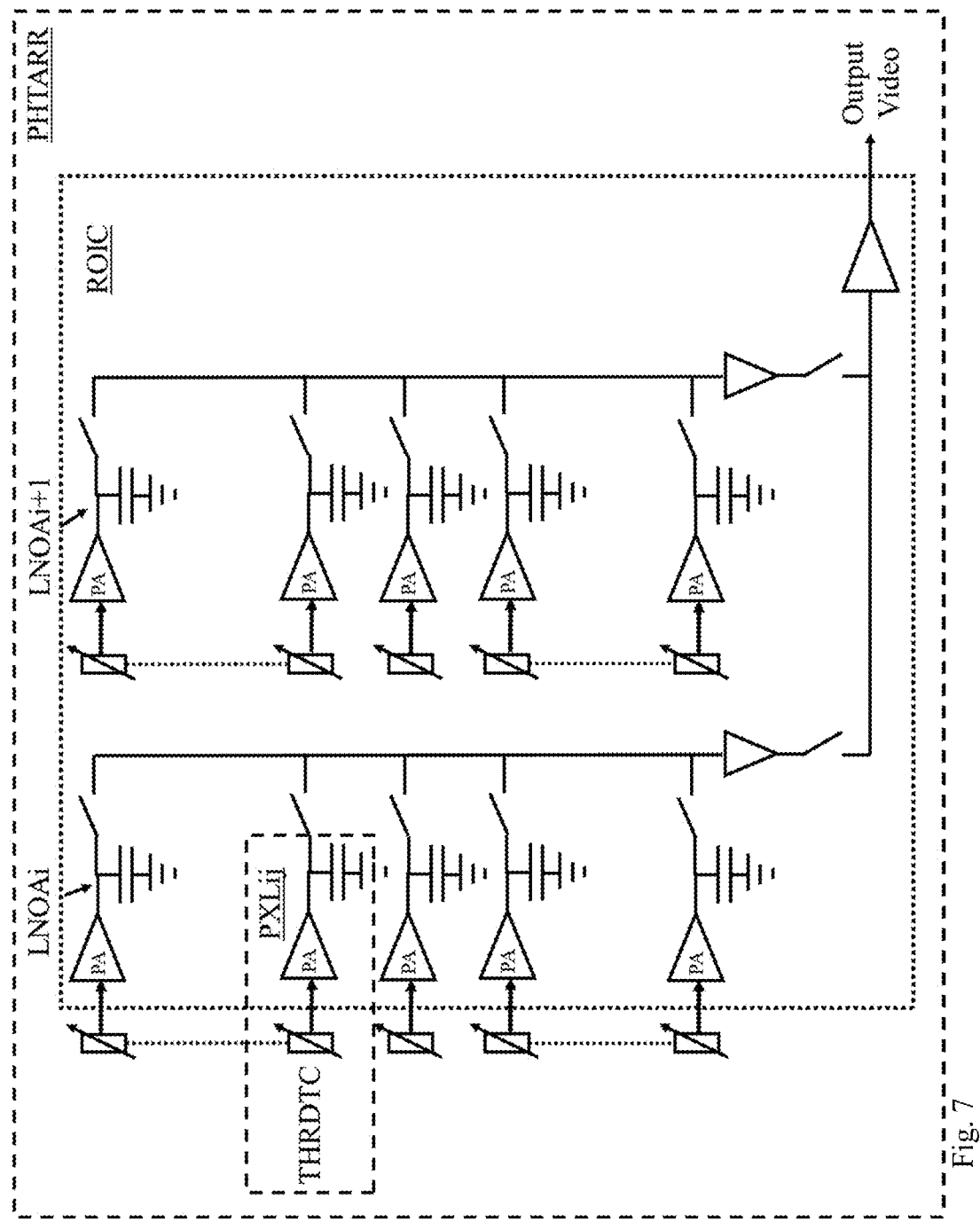
FIG. 7 depicts a thermal imaging detector array of standard design, referred to as photo array PHTARR.

FIG. 7 illustrates an exemplary schematic embodiment of a standard design of a slow response thermal imaging photo detector array PHTARR, or for short, photo array PHTARR. FIG. 7 shows a portion of two arbitrary lines of pixels PXLij of the thermal imaging photo array PHTARR, namely lines LNOAi and LNOAi+1. Each one pixel PXLij in these two lines includes a photo-detector which is composed of a material that is sensitive to incident light in the thermal wavelengths of the light spectrum. A read-out electronic circuit ROIC implemented in the substrate of the photo array PHTARR contains gates, which couples the pixels PXL into lines and the lines into a frame, separately for each line and separately for the entire photo array PHTARR. The entirety of the electronics is referred to for short as the integrated circuit ROIC. The main purpose of this integrated circuit ROIC is to transform the signals of the thermal photo array PHTARR into amplified voltage signals, and to transmit these amplified voltage signals synchronously in a standard international video format.

The thermal photo array PHTARR is composed of materials which are sensitive to thermal wavelengths. A few examples of such materials which are slow-responding and are also suitable for uncooled imaging include PbSe, VOx, and Amorphous Silicon.

FIG. 8 illustrates an exemplary schematic embodiment showing how the pixel sampling circuit PXSMP described hereinabove in relation to FIGS. 6, may be incorporated into a standard slow response bimodal array BMDARR. This bimodal array BMDARR may perform either standard thermal imaging or asynchronous pixel sampling for range finding purposes as described in relation with FIG. 4.

In FIG. 8, the line LNOAi depicts an exemplary embodiment of one arbitrarily selected line i of the bimodal array BMDARR, thus one line LNOAi, out of the plurality of lines LNOA of the bimodal array BMDARR.

In FIG. 8, each one pixel PXLij of the bimodal array BMDARR includes a thermal detector THRDTC, and a pre-amplifier PA, which may be used either for standard imaging purposes, or for range finding. The selected mode of operation into which the pixels PXLij of the bimodal array BMDARR is set, either imaging or ranging, is commanded by the mode switch PXMOD, and is received from an external source as described hereinbelow in relation to FIGS. 9 and 11. When the mode of operation of the mode switch PXMOD is selected as a LOGIC0, the output signal of the preamplifier PA will be connected directly to the output of the bimodal array BMDARR for standard imaging. However, when the selected mode of operation of the mode switch PXMOD is selected as a LOGIC1, the output signal of the preamplifier PA will be connected to a pixel sampling circuit PXSMP for range finding, as described in relation to FIG. 6. The simplicity of the pixel sampling circuit PXSMP allows the implementation thereof to be included in each pixel PXLij.

In turn, the pixels PXL of the line LNOAi are connected, via gates, to the output of the integrated circuit ROIC, in the same manner as for the standardly used imaging mode. Other components depicted in FIG. 4, namely including the interim memory INTMM, the clock, CLK, and the gate component FPGA, are assembled on the signal processor SGNPRC, which is different and separate from the bimodal array BMDARR.

Alternatively, some of these components may be implemented as a portion of the bimodal array BMDARR.

3D Thermal Imaging Implementation

Figure 9:
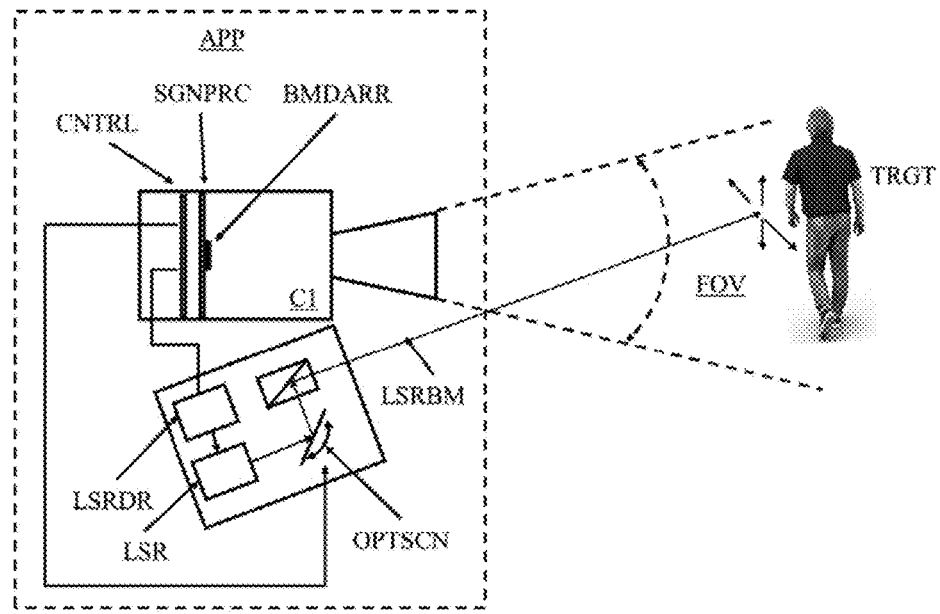
FIG. 9 illustrates a block diagram of an exemplary embodiment of the apparatus APP.

As illustrated in FIG. 9, the apparatus APP includes a thermal imager C1, or camera C1, which utilizes the bimodal array BMDARR and a signal processor SGNPRC. The signal processor SGNPRC includes a clock CLK, an interim memory INTMM, and a field-programmable gate component FPGA, as depicted in FIG. 8. The apparatus APP further includes a laser LSR which is controlled by a laser driver LSRDR. The laser LSR emits a laser beam LSRBM at a wavelength to which the bimodal array BMDARR is sensitive, and has a beam divergence much narrower than the field of view FOV of the camera C1.

Additional components of the apparatus APP include an optical scanner OPTSCN, and a controller CNTRL which operates the apparatus APP and different components thereof.

The optical scanner OPTSCN directs the laser beam LSRBM onto selected areas of the scenery viewed by the camera C1. It is assumed that according to common engineering practice, the optical scanner OPTSCN is aligned with the camera C1. It is further assumed that the controller CNTRL, which is coupled to the camera C1 and to the optical scanner OPTSCN, may direct the laser beam LSRBM to a specifically selected area of the scenery viewed by the camera C1. This may be achieved by commanding the optical scanner OPTSCN to shift to a specifically predefined angle of scan. That is to say that, an area selected in the field of view FOV of the camera C1 may be uniquely mapped by one specific angle of scan of the optical scanner OPTSCN.

Figure 10:
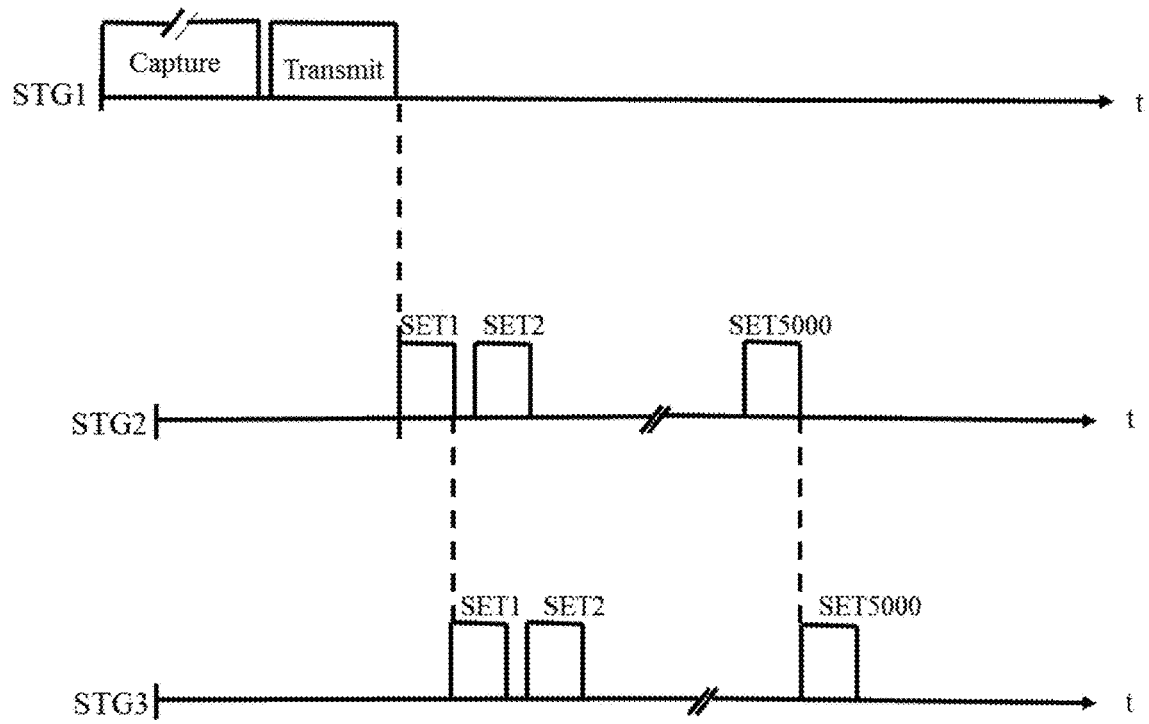
FIG. 10 illustrates a portion of the 2D image generated by bimodal array BMDARR, and a scanning pattern of the laser beam LSRBM projected thereon.

FIG. 10 illustrates an exemplary sequence of operation of the controller CNTRL of the apparatus APP, which may be implemented to generate a 3D imaging interlaced with a 2D image. For the sake of clarity of description, it is accepted that the bimodal array BMDARR has 100×100 pixels PXLij, that is, 100 lines LNOA of 100 pixels PXL each. It is also accepted that the apparatus APP generates images at a rate of 0.1 HZ, which is equivalent to a time sequence of 10 s.

At a first stage STG1 of operation, the controller CNTRL operates the bimodal array BMDARR to generate a 2D thermal image of a selected portion of the scenery. For this purpose, the bimodal array BMDARR is set by the controller CNTRL to an imaging mode by commanding operation of the mode switch PXMOD to a LOGIC0 which is sent to the pixels of the bimodal array BMDARR. Thereafter a 2D image is captured by use of a common standard method and is transmitted by the slow response bimodal array BMDARR to the gate component FPGA which is included in the signal processor SGNPRC, as depicted in FIG. 8. With the present example, the extent of time required for capturing and transmitting the 2D image, indicated as "capture" and "transmit" in FIG. 10, is 3.4 ms. This extent of time is based on the assumption of a 3 ms exposure time of the bimodal array BMDARR to the scenery, followed by a 400 us reading time of the pixel values and the transmission time of these values to the gate component FPGA.

At a second stage of operation STG2, following the previous first stage STG1, the controller CNTRL will operate the following components of the apparatus APP to generate a 3D image: the bimodal array BMDARR, the laser LSR via the laser driver LSRDR, the optical scanner OPTSCN, and the signal processor SGNPRC.

Figure 11:
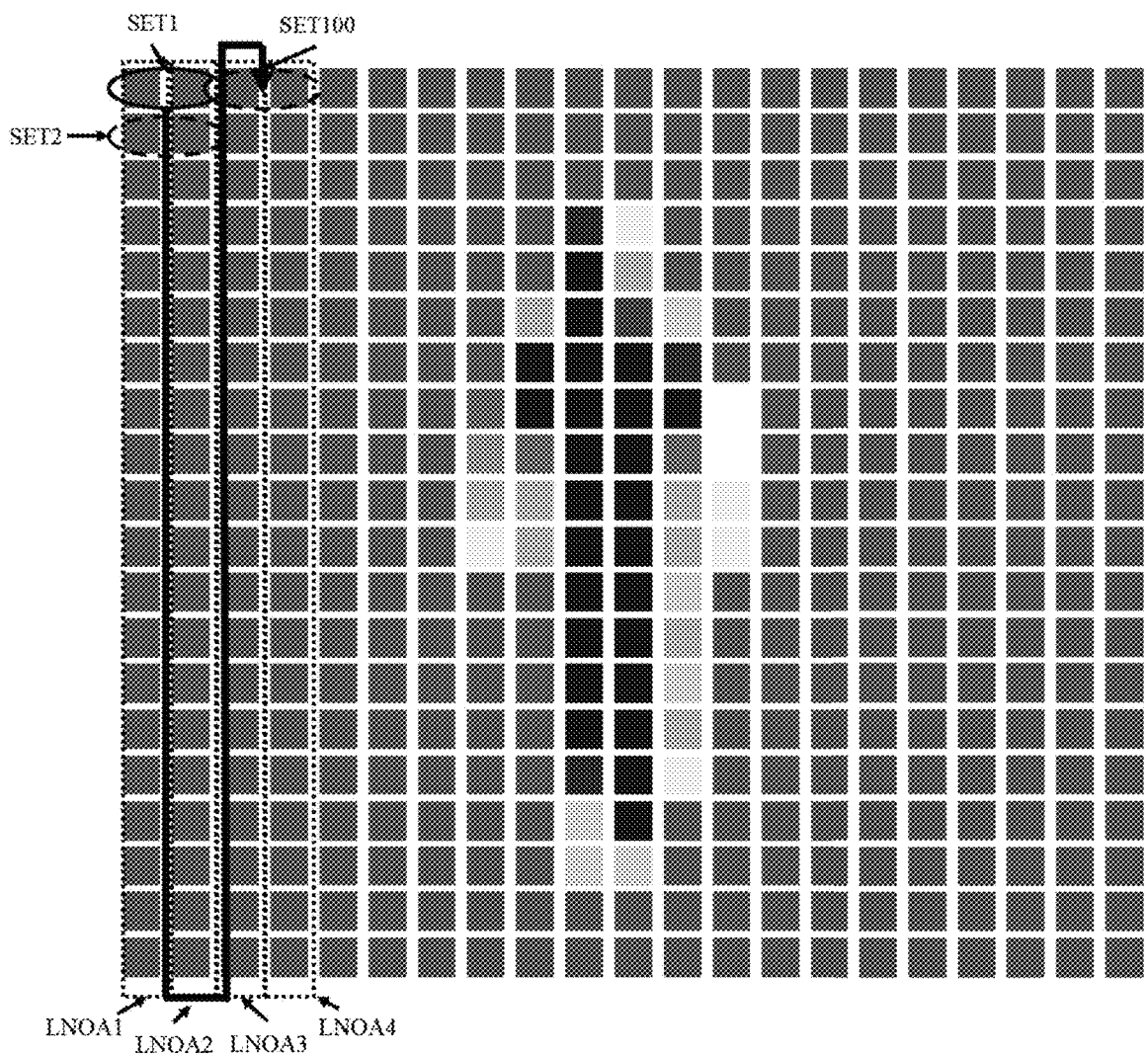
FIG. 11 depicts successive stages of operation of the controller CNTRL of the apparatus APP for the generation of 2D thermal images interlaced with 3D images.

Still at the second stage of operation STG2, FIG. 11 illustrates an exemplary portion of 21×20 pixels out of the 2D image generated by the bimodal array BMDARR at the first stage STG1. Further in FIG. 11, a scanning pattern of the laser beam LSRBM which is projected on the bimodal array BMDARR is indicated by an arrow marked A. In this present example, it is assumed that the width of the laser beam LSRBM is such that, when reflected from the scenery, or from the target TRGT and back to the camera C1, two pixels of the bimodal array BMDARR are illuminated at each instantaneous time.

The controller CNTRL commands the laser beam LSRBM to scan that portion of the selected scenery viewed by the camera C1, two pixels PXLij at a time, by adjusting the angle of scanning of the optical scanner OPTSCN according to a specific scanning pattern.

As a first step, the controller CNTRL, shown in FIG. 9, begins by setting the scanning pattern, thus the angle of scan of the optical scanner OPTSCN, to illuminate a first set SET1 of two pixels PXLij. In FIG. 11, the first set SET1 is disposed in the uppermost row, at the top of the first and the second columns, respectively LNOA1 and LNOA2. Thereafter, the controller CNTRL commands the first set SET1 to enter the range finding mode, by setting the mode switch PXMOD to a LOGIC"1". At a second step, the controller CNTRL starts the range finding process by sending a start command to the clock CLK and to the interim memory INTMM of the signal processor SGNPRC, and to the laser driver LSRDR. This is followed by the process described hereinabove with reference to FIGS. 4 to 6. In this present example, the duration of this entire process is 2 ms.

Next, at the third stage STG3, the controller CNTRL emits a signal which opens the gate G1, shown in FIG. 4, to deliver the file TMFL to the gate component FPGA for processing. In response thereto, the gate component FPGA calculates the range to the portion of the scenery related to the first set of pixels SET1, as described in relation to FIG. 11. In parallel, the controller CNTRL shifts the optical scanner OPTSC to illuminate a second set SET2 of two pixels PXL which is disposed in the second row, immediately underneath and adjacent the first set SET1, after which the range finding process for these two pixels PXL of SET2 is repeated. This range finding process is further repeated iteratively until the laser beam LSRBM reaches the end of the first two lines, respectively LNOA1 and LNOA2, on the lowermost row.

Thereafter, the laser beam LSRBM will be directed by the controller CNTRL to the first two pixels of the next two lines, respectively LNOA3 and LNOA4. This same scanning pattern will be repeated iteratively until the laser beam LSRBM completes the scanning of the entire portion of the scenery, thereby generating ranges to each and every pixel PXLij of that portion of the scenery. In this present example, the duration of time is approximately 10 s for the entire operation of the bimodal array BMDARR. Adding the duration of the 2D image generation, which is 3.4 ms, to the entire duration of the image generation, results in 10*s*, which is in correlation with the requirement for a rate of 0.1 HZ.

It should be noted that the various numerical examples provided herewith are presented for the sake of illustration, and are far from exhibiting the best obtainable performance achievable by operation of the apparatus APP. At a final stage, the gate component FPGA interlaces the thermal 2D image, stored in the memory thereof in pixel format, with the range data, by adding the range data of each pixel PXL to the stored 2D thermal image data. Thereby a 3D thermal representation of the scenery is created.

The result of the three stages STG of operation of the controller CNTRL is the capability to operate the 3D thermal imager C1 for imaging the scenery captured in the field of view thereof, to measure a range to selected objects in that field of view, and to interlace the 2D thermal image with the range data to generate 3D thermal imaging combining range with 2D thermal images.

It is noted that although not depicted as such in the drawings, other exemplary embodiments may operate differently, meaning that the sequence of operation of the described stages may be different, and so may be the number of instantaneously illuminated pixels, and the scanning pattern.

There has thus been described an imaging apparatus APP comprising a 3D thermal imager C1, a signal processor SGNPRC, a laser LSR, an optical scanner OPTSCN, and a controller CNTRL.

A characteristic of the apparatus, according to exemplary embodiments, is the use of slow-response thermal detectors for 3D imaging with high range resolution. Slow-response detectors are commonly available and are advantageously priced. The apparatus combines 2D thermal images with range data and creates 3D thermal imaging therefrom.

The apparatus APP comprises a bimodal array BMDARR, which is an electronic circuit that operates a plurality of slow response thermal detectors THRDTC. In use, the bimodal array BMDARR performs either standard thermal imaging, or asynchronous pixel sampling for range finding. The bimodal array is commanded by the controller and includes a plurality of slow response thermal detectors. Furthermore, the bimodal array is designed to produce a 2D thermal image as well as accurate range data by use of the slow response thermal detectors. Both the 2D thermal image, collected by each slow response thermal detector in the array, and the range data, are forwarded to the signal processor.

The controller is further configured to operate the laser, the optical scanner, and each one slow response thermal detectors of the thermal imager. Thereby, the controller is able to operate the laser, the optical scanner, and the thermal detectors of the thermal imager to derive therefrom range data. That range data is collected by use of a pixel sampling circuit which is dedicated to derive a plurality of couples of time events $t1i$ and $t2i$. Those couples of time events $t1i$ and $t2i$ are derived from a sampled detected signal DS which is communicated to the signal processor.

Finally, the signal processor is configured to compute the range with a degree of accuracy superior to the accuracy corresponding to the slow response thermal detectors in the array. Thereby, the signal processor is able to interlace the 2D thermal image with the range data, to generate 3D thermal imaging combining the range data with the 2D thermal images.

It is noted that the bimodal array includes a plurality of slow response thermal detectors, and that each one of those thermal detectors produces one pixel in a 2D thermal image and/or in 3D thermal imaging.

Each one of the detectors THRDTC is coupled to a mode switch PXMOD. The mode switch PXMOD is configured to set the bimodal array BMDARR in one of two modes of operation, i.e. one mode of operation which is one of an imaging mode, and a second mode which is a ranging mode.

The bimodal array BMDARR further comprises a plurality of pixel sampling circuits PXSMP. Each one pixel sampling circuit PXSMP is configured to recognize an ascending portion ta of a detected signal DS and a decaying portion td of the detected signal DS. The signal processor SGNPRC further comprises a clock CLK, and the clock CLK is coupled to an interim memory INTMM. The pixel sampling circuits PXSMP is coupled to the interim memory INTMM. The pixel sampling circuits PXSMP is configured to send a clock sampling signal CLKSMP and a flag signal R/F to the signal processor SGNPRC. In response to those two signals, the signal processor SGNPRC commands the interim memory INTMM to store a current reading of the clock CLK and of the flag signal R/F.

Each one pixel sampling circuit PXSMP is coupled to the interim memory INTMM, and is configured to perform at least two operations. A first operation of the pixel sampling circuit PXSMP is to create two series of time events, namely a first series of time event $t1i$ and a second series of time event $t2i$. The time events $t1i$ belong to an ascending portion ta of a detected signal DS and the time events $t2i$ belongs to a decaying portion td of the same detected signal DS. The second operation that the pixel sampling circuit PXSMP performs is to indicate to which one of both the ascending portion ta and the decaying portion td each one of the time event pertains.

The interim memory INTMM is coupled to a component FPGA via a gate G1. Opening of the gate G1 is commanded by the thereto configured signal processor SGNPRC. Thereby, the two series of time events $t1i$ and $t2i$ which are stored in the interim memory INTMM may be forwarded as a data file TMFL to the component FPGA.

The gate component FPGA is configured to locate a transition point TRPNT in the data file TMFL. The transition point TRPNT separates apart between the two series of time events $t1i$ and $t2i$. To find the transition point TRPNT, it suffices to locate the emplacement in the data file TMFL where the flag signal R/F switches from a setting to a LOGIC1 to a setting to a LOGIC0, or vice versa, the emplacement where the flag signal R/F switches from a setting to a LOGIC0 to a setting LOGIC1.

As described hereinabove, the pixel sampling circuit PXSMP is configured to derive a plurality of couples of time events $t1i$ and $t2i$ from a sampled detected signal DS. These couples of time events $t1i$ and $t2i$ may be used to compute a range to a target TRGT.

The pixel sampling circuit PXSMP is further configured for both: to deliver the flag signal R/F and to derive the plurality of couples of time events $t1i$ and $t2i$. Both of these are collected by asynchronous sampling of the detected signal DS. The detected signal DS has an ascending portion ta and a decaying portion td. The flag signal R/F is configured to indicate to which one of the ascending portion ta and the decaying portion td each one of the time events $t1i$ and $t2i$ is related.

The pixel-sampling circuits PXSMP are still further configured to perform at least two more operations. One more operation is to asynchronously sample the ascending portion ta and the decaying portion td of the sampled detected signal DS. The purpose of the asynchronous sampling is to derive the couples of two time events in sequential steps of constant and equal spans of interval INTVL and at successive levels of amplitude AMPLVLi.

The second operation is to deliver the flag signal R/F for the purpose of indicating to which one of the two time events $t1i$ and $t2i$ each time event belongs. In turn, a data file TMFL containing the couples of time events $t1i$ and $t2i$ and the flag signals R/F is stored in the interim memory INTMM upon delivery of the clock sampling signal CLKSMP.

Each one couple of the time events $t1i$ and $t2i$ includes a first time event $t1i$ and a second time event $t2i$. In the first time event $t1i$, the first index is indicated as 1. In the second time event $t2i$, the first index is indicated as 2. The first index and the second index are correlated with the flag signal R/F. Each one time event $t1i$ and $t2i$ is identified by a second index i. That second index i is related to an amplitude level AMPLVLij. Each one of the time events $t1i$ and $t2i$ is saved on an opposite side of a transition point TRPNT having two sides. The time events $t1i$ are saved in the time file TMFL on a first side of the transition point TRPNT, and the time events t2i are saved in the time file TMFL on a second side of the transition point TRPNT. Time events having a numerical lower index i are stored closer to the transition point TRPNT whereas time events having a numerical higher index i are stored farther away from the transition point TRPNT.

The thermal detector THRDTC may be selected as an uncooled detector or as a cooled detector.

There has thus also been described a method for constructing and implementing an imaging apparatus APP. The imaging apparatus APP comprises a 3D thermal imager C1, a signal processor SGNPRC, a laser LSR, an optical scanner OPTSCN, and a controller CNTRL. The method uses a slow response thermal detector THRDCT for deriving a detected analog signal DS from an emitted laser pulse LP which is returned from a target TRGT. The method asynchronously samples the detected signal DS for deriving therefrom two series of time events, respectively t1i and t2i. Furthermore, the method derives a time Tbg by use of equation (equ. 3), and of equations (equ. 4.1), (equ. 4.2), and (equ. 4.3). Thereafter, the method calculates the range R to the target TRGT by use of (equ. 5).

The method uses a thermal detector THRDTC which may be selected either as an uncooled detector or as a cooled detector.

With the method, the detected signal DS has an ascending portion ta and a decaying portion td. The detected signal DS is asynchronously sampled on the thereof ascending portion ta, and on the thereof decaying portion td.

Furthermore, the detected signal DS is asynchronously sampled in sequential and consecutive amplitude steps of constant and equal amplitude intervals INTVL.

With the method, sampled signals SIGSMP are saved in a time file TMFL. The sampled signals SIGSMP are listed in the time file TMFL in a pattern which is symmetric about a transition point TRPNT.

The detected signal DS may be amplified to an analog voltage signal Vo(t) before input into a pixel sampling circuit PXSMP. The pixel sampling circuit PXSMP has a twofold functionality. The detected signal DS is amplified to an analog voltage signal Vo(t) for input into a pixel sampling circuit PXSMP. The pixel sampling circuit PXSMP has at least two functions. A first function of the pixel sampling circuit PXSMP deals with the determination and indication whether the voltage signal Vo(t) is rising or is decaying. A second function of the pixel sampling circuit PXSMP deals with the determination whether the signal Vo(t) has reached a next amplitude level AMPLVLi or not.

The pixel sampling circuit PXSMP is an element of a main electrical circuit MNCRCT. The pixel sampling circuit PXSMP is configured to operate the asynchronous pixel sampling process.

The main electrical circuit MNCRCT comprises a standard sample and hold circuit SMPHOL. The sample and hold circuit SMPHOL is coupled to a delay line DL. The delay line DL and the sample and hold circuit SMPHOL are configured to prevent a possible internal collision of derived data.

INDUSTRIAL APPLICABILITY

The exemplary embodiments of the apparatus and the method described hereinabove are applicable in industries and appliances using cameras including, for example, public health, civil safety and protection, robotics, and guidance and navigation of vehicles.

List of Reference Items

| # | Name |
|---|---|
| APP | apparatus |
| BMDARR | bimodal array |
| C1 | camera |
| CLK | clock or time counter |
| CLKSMP | clock sampling signal |
| CNTRL | controller |
| COMP | comparator |
| DL | delay line |
| DS | detected signal |
| DTCT | slow response laser pulse detector |
| FPGA | FPGA component |
| FPGAMM | gate component memory |
| G1 | gate G1 |
| INTMM | interim memory |
| INTVL | amplitude interval |
| LNOA | line of array |
| LP | laser pulse |
| LSR | laser |
| LSRBM | laser beam |
| LSRDR | laser driver |
| LXOR | logic XOR gate |
| MNCRCT | main electrical circuit |
| OPTCOM | optical components |
| OPTSCN | optical scanner |
| PA | preamplifier |
| PHTARR | photo array |
| PXL | pixel |
| PXMOD | mode switch |
| PXSMPL | pixel sampling circuit |
| R | range |
| R/F | output flag |
| ROIC | read-out integrated circuit |
| SGNPRC | signal processor |
| SIGSMP | sampled signal |
| SLRDCT | slow response thermal detector |
| STRT | start signal |
| TID | thermal imaging device |
| THRARR | thermal imaging detector array |
| THRDCT | slow response thermal photo detector TC |
| TMFL | data file |
| Tpeak | time of maximal intensity |
| TRGT | target |

The invention claimed is:

1. An imaging apparatus comprising:
a 3D thermal camera;
a signal processor;
a laser;
an optical scanner;
a controller; and
a bimodal array performing in one of i) standard thermal imaging and ii) asynchronous pixel sampling for range finding, and commanded by the controller,
wherein the bimodal array includes a plurality of slow response thermal detectors, and is configured to generate a 2D thermal image and accurate range data by use of the slow response thermal detectors, and wherein the 2D thermal image and range data are forwarded to the signal processor,
wherein the controller is further configured to operate the laser, the optical scanner, and the thermal camera to derive range data by use of a pixel sampling circuit which is configured to derive a plurality of couples of time events t1i and t2i from a sampled detected signal which is communicated to the signal processor, and
wherein the signal processor is configured to compute the range with accuracy superior to the accuracy corresponding and relative to the detector time response and interlace the 2D thermal images with the range data to generate 3D thermal images.

2. The apparatus of claim 1, wherein the bimodal array includes a plurality of slow response thermal detectors, each one of which produces one pixel in a 2D thermal image and in a 3D image.

3. The apparatus of claim 2, wherein the pixel sampling circuits are configured to:
- asynchronously sample the ascending portion ta and the decaying portion td of the sampled detected signal, to derive the couples of two time events in sequential steps of constant and equal spans of interval and at successive levels of amplitude,
- deliver the flag signal R/F to indicate to which one of the two time events t1$i$ and t2$i$ each one time event pertains, and
- a data file containing the couples of time events t1$i$ and t2$i$ and the flag signals R/F is stored in an interim memory upon delivery of a clock sampling signal.

4. The apparatus of claim 3, wherein:
- each one couple of the time events t1$i$ and t2$i$ includes a first time event t1$i$ wherein a first index is indicated as 1, and a second time event t2$i$ wherein the first index is indicated as 2, which indices 1 and 2 are correlated with the flag signal R/F,
- each one time event t1$i$ and t2$i$ is identified by a second index $i$ wherein the second index is related to an amplitude level,
- the time events t1$i$ are saved in the time file on a first side of a transition point having two sides, and the time events t2$i$ are stored on a second side of the transition point, and
- time events having a numerical lower index $i$ are stored closer to the transition point.

5. The apparatus of claim 1, wherein the thermal detector is one of an uncooled detector and a cooled detector.

6. A method for an imaging apparatus comprising a 3D thermal camera, a signal processor, a laser, an optical scanner, and a controller, the method comprising:
- using a slow response thermal detector for deriving a detected analog signal from an emitted laser pulse returned from a target,
- asynchronously sampling the detected signal for deriving therefrom two series of time events, respectively t1$i$ and t2$i$,
- deriving a time Tbg by use of one of:

$$Tbg = -\tau \cdot \ln\left(e^{-t1i/\tau} + \left(e^{PW/\tau} - 1\right) \cdot e^{-t2i/\tau}\right), \text{ and} \quad \text{(equ. 3)}$$

$$Tbg = -\tau \cdot \ln\left(Cr \cdot e^{-(t1i-tr)/\tau} + \left(Cf - Cr \cdot e^{-(PW-tr)/\tau}\right) \cdot e^{-(t2i-PW)/\tau}\right), \quad \text{(equ. 4.1)}$$

-continued $$Cr = \frac{\tau}{tr}\left(1 - e^{-tr/\tau}\right), \quad \text{(equ. 4.2)}$$

$$Cf = \frac{\tau}{tf}\left(1 - e^{-tr/\tau}\right), \quad \text{(equ. 4.3)}$$

wherein T is a time constant of the slow response detectors, t1$i$ is a first time event, PW is a pulse width of the laser pulse, t2$i$ is a second time event, tr is the rise time of the laser pulse and tf is the fall time of the laser pulse, and calculating the range to the target by use of $$R = c \cdot Tbg/2 \quad \text{(equ. 5),}$$

wherein Tbg equals the time of flight.

7. The method of claim 6, wherein the detector is a slow response thermal detector costing at least one order of magnitude less than the cost of commercially available high quality and high-speed detectors.

8. The method of claim 6, wherein the detector is an uncooled detector.

9. The method of claim 6, wherein the detected signal has an ascending portion and a decaying portion, and is asynchronously sampled on both of the thereof ascending portion and the decaying portion.

10. The method of claim 6, wherein the detected signal is asynchronously sampled in sequential and consecutive amplitude steps of constant and equal amplitude intervals.

11. The method of claim 6, wherein sampled signals are saved in a time file, and are listed therein in a pattern which is symmetric about a transition point.

12. The method of claim 6, wherein the detected signal is amplified to an analog voltage signal before input into a pixel sampling circuit which has a twofold functionality.

13. The method of claim 6, wherein the detected signal is amplified to an analog voltage signal for input into a pixel sampling circuit which has:
- a first function for determination and indication whether the voltage signal is rising or is decaying, and
- a second function for determination whether the signal has reached a next amplitude level.

14. The method of claim 13, wherein: the pixel sampling circuit is incorporated into the bimodal array which is configured to perform thermal imaging and asynchronous pixel sampling for range finding.

15. The method of claim 14, wherein:
- the pixel sampling circuit is an element of a main electrical circuit, and is configured to operate the asynchronous pixel sampling process, and
- the main electrical circuit comprises a standard sample and hold circuit which is coupled to a delay line, the last two being configured to prevent a possible internal collision of derived data.

* * * * *

UNITED STATES PATENT AND TRADEMARK OFFICE
CERTIFICATE OF CORRECTION

| | | |
|---|---|---|
| PATENT NO. | : 12,292,506 B2 | Page 1 of 1 |
| APPLICATION NO. | : 18/015306 | |
| DATED | : May 6, 2025 | |
| INVENTOR(S) | : Amit Frank | |

It is certified that error appears in the above-identified patent and that said Letters Patent is hereby corrected as shown below:

In the Claims

In Column 18, Line 5, delete "$Cf = \frac{\tau}{tf}(1 - e^{-tf/\tau})$," and insert -- $C\hat{t} = \frac{\tau}{tf}(1 - e^{-tf/\tau})$, --.

Signed and Sealed this
Fourteenth Day of October, 2025

John A. Squires
*Director of the United States Patent and Trademark Office*